United States Patent [19]

Smith et al.

[11] Patent Number: 5,735,089
[45] Date of Patent: Apr. 7, 1998

[54] SACRIFICIAL GLAZING FOR A WINDOW ASSEMBLY

[75] Inventors: Mark Loyd Smith, Niles, Mich.; Michael H. Hurtekant, Goshen, Ind.

[73] Assignee: Excel Industries Incorporated, Elkhart, Ind.

[21] Appl. No.: 644,331

[22] Filed: May 10, 1996

[51] Int. Cl.⁶ ........................................ F06B 3/26
[52] U.S. Cl. .............. 52/202; 49/63; 49/489.1; 52/204.597; 52/204.7; 52/208
[58] Field of Search ............... 52/204.5, 204.1, 52/204.51, 204.597, 204.595, 202, 203, 204.62, 208; 49/489.1, 495.1, 496.1, 62, 63, 463

[56] References Cited

U.S. PATENT DOCUMENTS

| | | | |
|---|---|---|---|
| D. 350,322 | 9/1994 | Carson et al. | 52/202 X |
| 2,193,852 | 3/1940 | Axe | 52/204.595 |
| 2,591,048 | 4/1952 | Bush | 52/606 X |
| 3,140,115 | 7/1964 | Bliss . | |
| 3,266,560 | 8/1966 | Mooskian . | |
| 3,680,276 | 8/1972 | Wright et al. | 49/489.1 X |
| 3,824,753 | 7/1974 | Anderson | 49/62 X |
| 3,959,941 | 6/1976 | Smith | 52/204.597 |
| 4,295,306 | 10/1981 | Garman | 52/204.597 X |
| 4,313,280 | 2/1982 | Ehret et al. | 49/141 |
| 4,331,359 | 5/1982 | Sheldon | 49/63 X |
| 4,562,666 | 1/1986 | Young, III | 49/62 |
| 4,726,149 | 2/1988 | Tryba | 49/465 |
| 4,763,454 | 8/1988 | Brockhaus | 52/202 |
| 4,768,823 | 9/1988 | Martinez | 296/95 C |
| 5,002,326 | 3/1991 | Westfield | 296/95.1 |
| 5,123,211 | 6/1992 | Schlicht et al. | 52/202 |
| 5,242,207 | 9/1993 | Carson et al. | 52/203 X |
| 5,522,191 | 6/1996 | Wenner et al. | 52/204.51 |

OTHER PUBLICATIONS

CRL *One–Piece Weatherstrip Insert Tools* –p.110 C.R. Laurence Co., Inc.

CRL *One–Piece Self–Sealing Weatherstrip* –pp. 146 and 147 –C.R. Laurence Co., Inc.

*Primary Examiner*—Michael Safavi
*Assistant Examiner*—Winnie S. Yip
*Attorney, Agent, or Firm*—Banner & Witcoff, Ltd.

[57] ABSTRACT

A window assembly for use in mass transit windows has a frame, a windowpane sized to fit within the frame, a removable sacrificial glazing panel covering or protecting one side of the windowpane, and a self-locking seal assembly biasingly securing the removable glazing panel towards the windowpane without the need for screws, drills or welds. The seal assembly has a first interlocking arm provided with a locking lip, and a second interlocking arm with a receiving groove which is biased from its free position into a locking position in locking engagement with the locking lip of the first arm. Preferably the locking arms are unitary with the seal assembly. The locking arms may be disengaged and the sacrificial glazing removed and a new sacrificial glazing panel installed without removing or disassembling other components of the window assembly. In certain preferred embodiments where it is deskable to be able to remove both the sacrificial glazing and the windowpane, the seal assembly has a channel glazing segment and a wedge seal segment which cooperate to captivate both the windowpane and the sacrificial glazing. Preferably the locking arms are unitary with the wedge seal segment. A retrofitting kit is also provided for retrofitting existing window assemblies to incorporate sacrificial glazing panels.

19 Claims, 6 Drawing Sheets

SACRIFICIAL GLAZING FOR A WINDOW ASSEMBLY

FIELD OF THE INVENTION

The present invention is directed to improved window assemblies having a removable sacrificial glazing that is of low cost and can be quickly assembled and disassembled.

BACKGROUND

A sacrificial glazing panel is typically a relatively inexpensive transparent sheet of material protecting a more expensive windowpane behind it. Window assemblies employing sacrificial glazing are used in mass transit vehicles, particularly buses, where vandalism and wear to the windowpanes are problems. Use of sacrificial glazing panels saves the cost and difficulty incurred with removing and replacing the compete window assembly. One such recently developed window assembly employing a sacrificial glazing is shown in U.S. Pat. No. 5,242,207 to Carson et al. This patent discloses a rectangular window for the interior side of a public transportation vehicle protected by an anti-vandalism transparent sheet. The sheet is secured to the rest of the window assembly by a plurality of brackets. The brackets are screwed or welded to the frame and the sheet is captivated between the brackets and the windowpane.

A problem with such designs is that holes need to be drilled into the mounting brackets and into the frame, increasing assembly time. Another problem is that screws are used which can be dropped or mishandled during assembly and disassembly. Additionally, replacement of sacrificial glazing panels in this manner is relatively labor intensive. It is an object of the present invention to provide a sacrificial glazing which is simple to install and has a minimal number of parts. Additional objects and features of the invention will become apparent from the following disclosure taken together with the detailed discussion below.

SUMMARY

In accordance with a first aspect a window assembly, typically a window assembly for use in a motor vehicle, has a windowpane surrounded by a frame and is protected on at least one side by a sacrificial glazing panel, preferably a transparent sheet of material. A self-locking seal assembly is mounted to the frame. The self-locking seal assembly overlaying the windowpane biasingly secures the sacrificial glazing towards the windowpane without the need to drill holes into or through the frame, use screws or other such fasteners, or weld parts together, making the design easy to assembly and disassemble.

The self-locking seal assembly has flexible interlocking arms which releasably engage one another in a locking position to captivate and bias the sacrificial glazing panel towards or against the windowpane. If the sacrificial glazing panel is damaged or scratched, the interlocking feature of the self locking seal may be temporarily released or unzipped, allowing for easy removal and for easy re-installation of a replacement sacrificial glazing panel.

In certain preferred embodiments the interlocking arms of the serf-locking seal assembly may be unitary with the rest of the seal assembly, that is, both the arms and the main body of the self- locking seal assembly may be of one-piece construction.

Each self-locking seal assembly may incorporate one or more seal segments. For example, where it is desirable to be able to remove both the sacrificial glazing panel and the windowpane, a channel glazing seal segment and at least one wedge seal segment may be employed. Moreover, in window assemblies of a generally rectangular shape four wedge seal segments may be used, such that each segment captivates one edge of the sacrificial glazing. Optionally the wedge seal segments may have mitered ends to provide an enhanced contacting sealing surface between segment ends.

Window assemblies using sacrificial glazing panels, as disclosed here optionally can be fixed to a wall. They can be slidable or pivotably openable. In designs where the window assembly is fixed or pivotally openable, the self-locking seal assembly preferably is comprised of a channel glazing seal segment and a wedge seal segment, preferably the interlocking arms being unitary with the wedge segment to releasably secure the sacrificial glazing to the rest of the window assembly.

In accordance with certain highly advantageous features the window assemblies disclosed here avoid the cost and complexity associated with drilling additional holes into existing window assemblies. In accordance with another aspect a retrofitting kit is provided for window assemblies that does not require the use of screws or welds for installing the self-locking assembly and removable sacrificial glazing panel. Such kits would include the sacrificial glazing and at least one wedge seal segment, preferably four wedge seal segments with mitered edges. Alternatively a single wedge seal segment could be employed, particularly in window assemblies using radius cornered frames. Additional features and advantages of various preferred embodiments will be better understood in view of the detailed description provided below.

BRIEF DESCRIPTION OF THE DRAWINGS

Certain preferred embodiments are discussed below with reference to the appended drawings wherein.

It should be understood that the appended drawings are not necessarily to scale, presenting a somewhat simplified representation of certain preferred embodiments illustrative of the basic principles of the invention. The specific design of window assemblies in accordance with the invention, including, for example, specific configuration and dimensions of the sacrificial glazing panel and the self-locking seals will be determined in part by the intended application and use environment. Certain features of the assembly have been enlarged or distorted relative to others to facilitate visualization and clear understanding. In particular, thin features may be thickened, for example, for clarity of illustration. All references to direction and position, unless otherwise indicated, refer to the orientation of the window assemblies illustrated in the drawings. In general, directions to the right and left in the plane of the paper in FIG. 1 will be referred to as lateral directions, and the directions normal to the plane of the paper in FIG. 1 shall be referred to as inboard and outboard. The directions from the periphery of the windowpane towards the center of the windowpane shall be referred to as laterally inward. It should be understood that window assemblies in accordance with the invention can be used in diverse applications.

DETAILED DESCRIPTION OF CERTAIN PREFERRED EMBODIMENTS

The following discussion of certain preferred embodiments focuses on window assemblies used in mass transit vehicles, but the design and operating principles are applicable generally to windows suitable for diverse applications. In the embodiments disclosed here, the window assembly has a generally rectangular shape, as is common in current production mass transit window designs. However, it will be readily apparent to those skilled in the art that window assemblies having alternate geometries may be employed within the scope of the invention.

Figure 1:
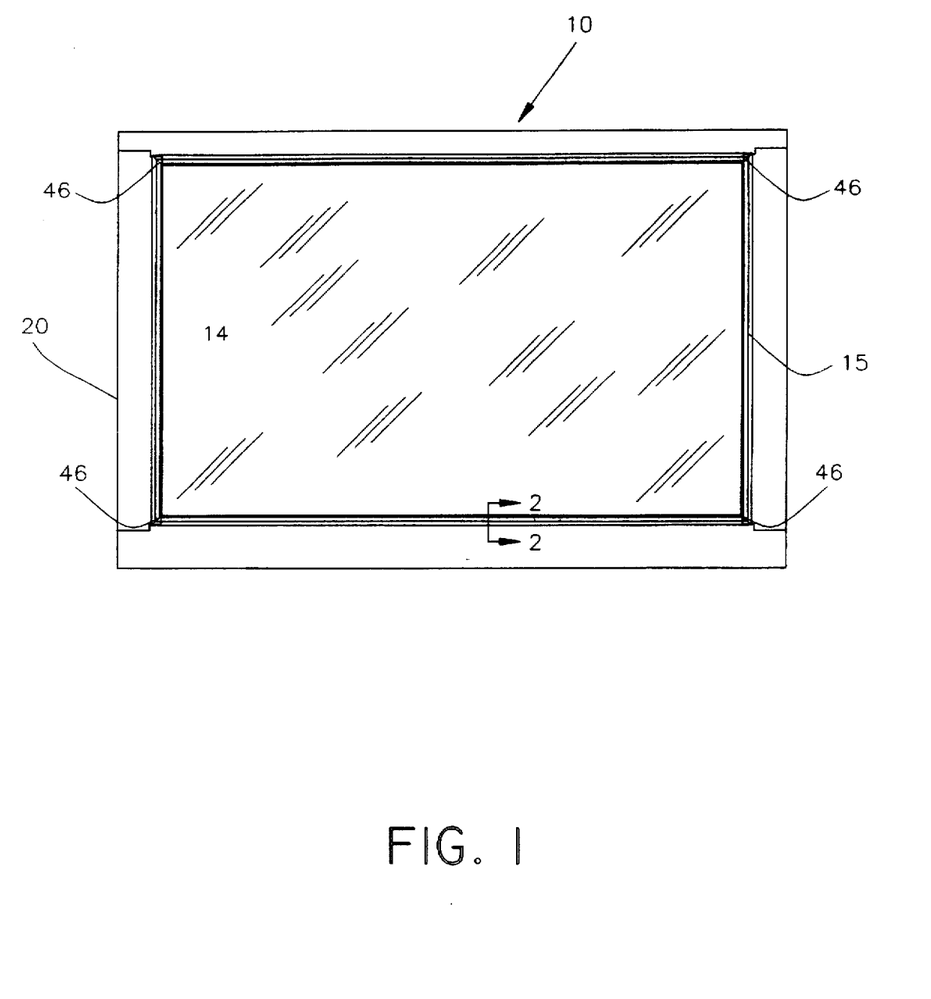
FIG. 1 is an elevation view of an outboard side of a window assembly in accordance with a preferred embodiment.
Figure 2:
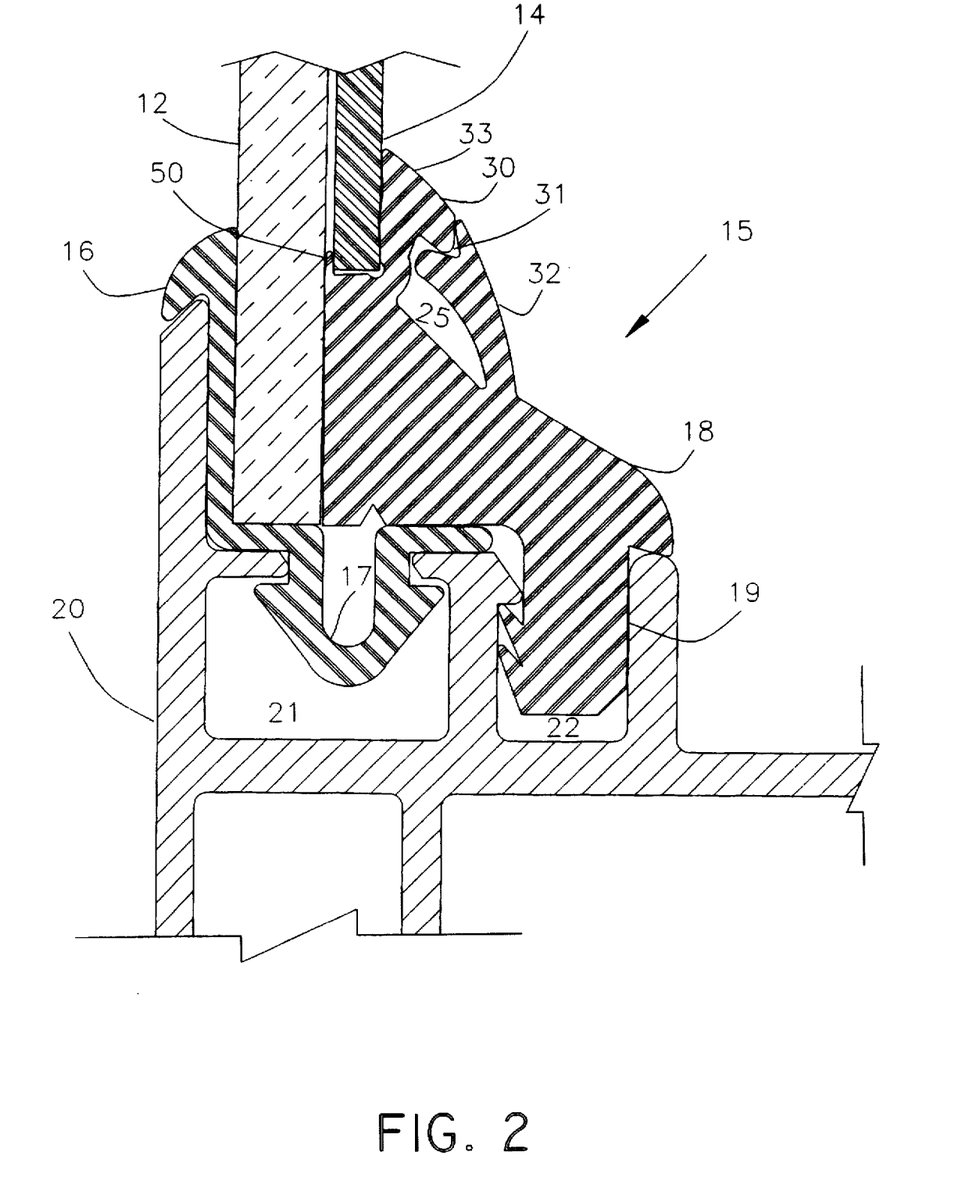
FIG. 2 is a cross sectional view taken along the line 2—2 in FIG. 1, showing a wedge seal segment and a channel glazing seal segment, as can be used in a stationary or a pivotably releasable window assembly.
Figure 5:
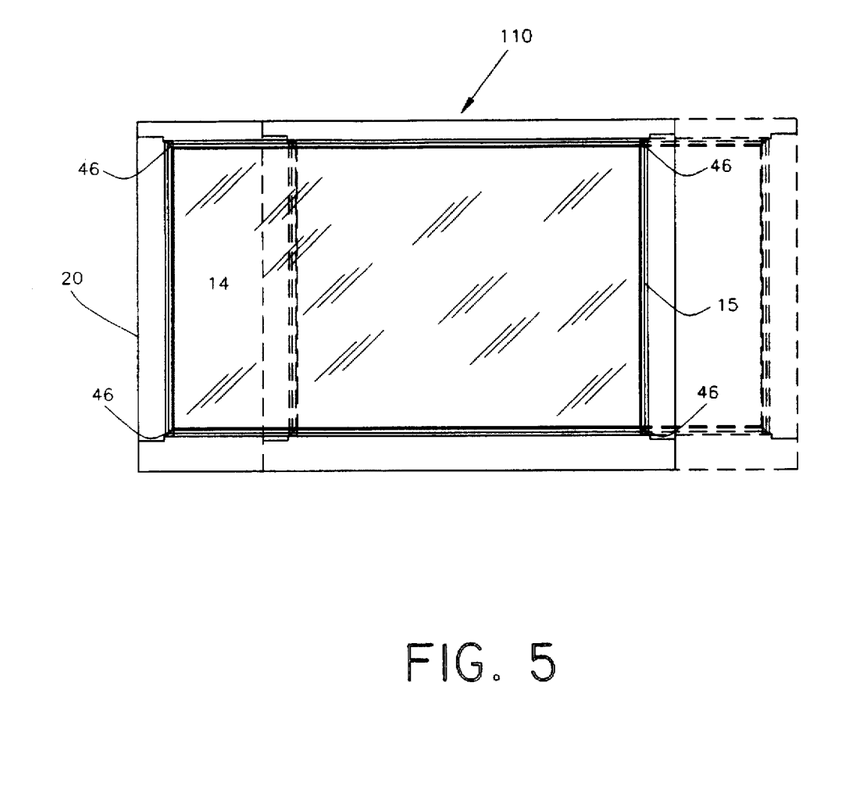
FIG. 5 is an elevation view of a slidingly openable window assembly in accordance with one embodiment of the invention, shown in an open position.
Figure 6:
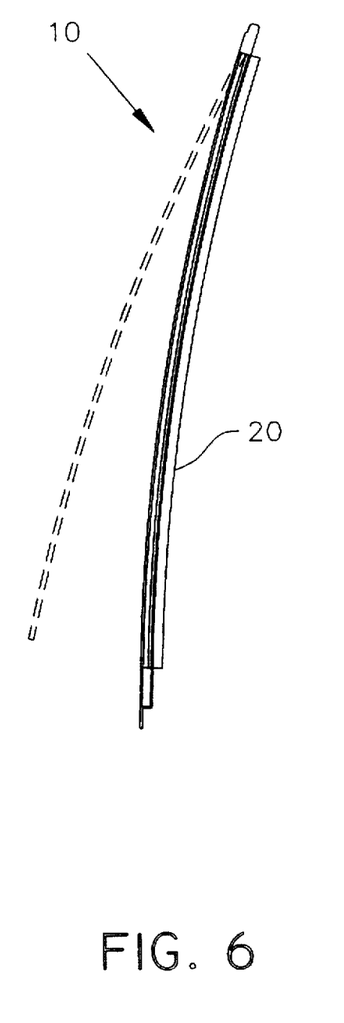
FIG. 6 is side view of a pivotably openable window assembly in accordance with one embodiment of the invention, shown in an open position.

Referring now to the preferred embodiment depicted in FIGS. 1–2, looking at the outboard side, window assembly 10 is seen to have a frame 20. In this preferred embodiment, the windowpane 12 is fixed in the frame 20. The window assembly 10 including frame 20 may be pivotable from a closed position to an open position as shown in FIG. 6, or slidable as shown for window assembly 110 in FIG. 5, or it may be fixed. A transparent sheet of material serves as a removable sacrificial glazing or glazing panel 14, that is, it is a part of the window assembly which, when damaged may be easily removed without incurring the costs associated with disassembling the rest of the window assembly. Acrylic or polycarbonate materials or other suitable transparent material may be used for the sacrificial glazing. The removable sacrificial glazing panel 14 is sized to cover at least most of the interior side of the windowpane 12.

In a highly advantageous feature of this invention, the sacrificial glazing 14 is secured to the rest of the window assembly by a seal assembly 15 seated in the frame 20 and mounted around the periphery of the sacrificial glazing. The seal assembly is preferably made of rubber or other similar extruded or molded material. In the preferred embodiment shown in FIG. 2, the frame 20, preferably made of extruded aluminum, has a first channel 21 and a second channel 22. The seal assembly 15 has a channel glazing seal segment 16 secured to the frame 20 with a dart 17 extending into the first channel 21 in a releasably locking manner, and a wedge seal segment 18 secured to the frame 20 with a leg segment 19 extending into the second channel 22. Thus in this embodiment a channel glazing seal segment and a wedge seal segment of the seal assembly cooperate to secure both the windowpane and the sacrificial glazing to the window assembly. This allows for serviceability of the windowpane, and or the sacrificial glazing panel, as in the situation where the windowpane is shattered or the sacrificial glazing panel is damaged or both and need to be replaced.

The wedge seal segment 18 is seen to have a first arm 33 that sits against and extends inwardly from the periphery of the sacrificial glazing 14, and a second arm 32 which extends upwardly to releasably engage the first arm 33 when the self-locking seal arms are in their interlocking position, as shown in FIG. 2. The first arm 33 has a locking lip 30 and the second arm 32 has a receiving groove 31. In its locking position the second arm 32 is biased outboard towards the windowpane 12. It engages the first arm 33, and the locking lip 30 seats in the receiving groove 31 of the second arm to prevent motion of the second arm back to a free, unbiased position.

When the seal assembly is in the locking position, the first arm 33 captivates and securably biases the sacrificial glazing towards the windowpane. Optionally, a spacing segment 50 may extend laterally inward between the windowpane 12 and the sacrificial glazing 14 to create an air gap. Preferably the first arm 33 and the second arm 32 are unitary or of one-piece construction with the wedge segment 18 of the seal assembly.

Disassembly and removal of the sacrificial glazing is readily accomplished, preferably by using a locking tool such as CRL Locking Tool for Self-Seal Stripping, Cat. No. LT112, as found in the CR Laurence catalog entitled "Glazing Industrial Construction & Automotive Supplies", the entire disclosure of which is hereby incorporated by reference. The locking tool has a hand grip and an extending rod with a ball shaped end. The ball-shaped end is inserted into the air gap groove 25 of the wedge seal segment 18 defined between the first arm 33 and the second arm 32. The ball causes the first arm 33 to disengage the second arm 32 at that point. Then, an operator would simply move the tool along the length of the seal assembly, around the periphery of the plastic glazing, disengaging the first arm from the second arm and allowing the sacrificial glazing to be removed and a new sacrificial glazing to be installed. Installation follows the process in reverse; by moving the tool along the groove 25 the rubber locking lip 30 locks into the second arm 32 locking position.

Figure 3:
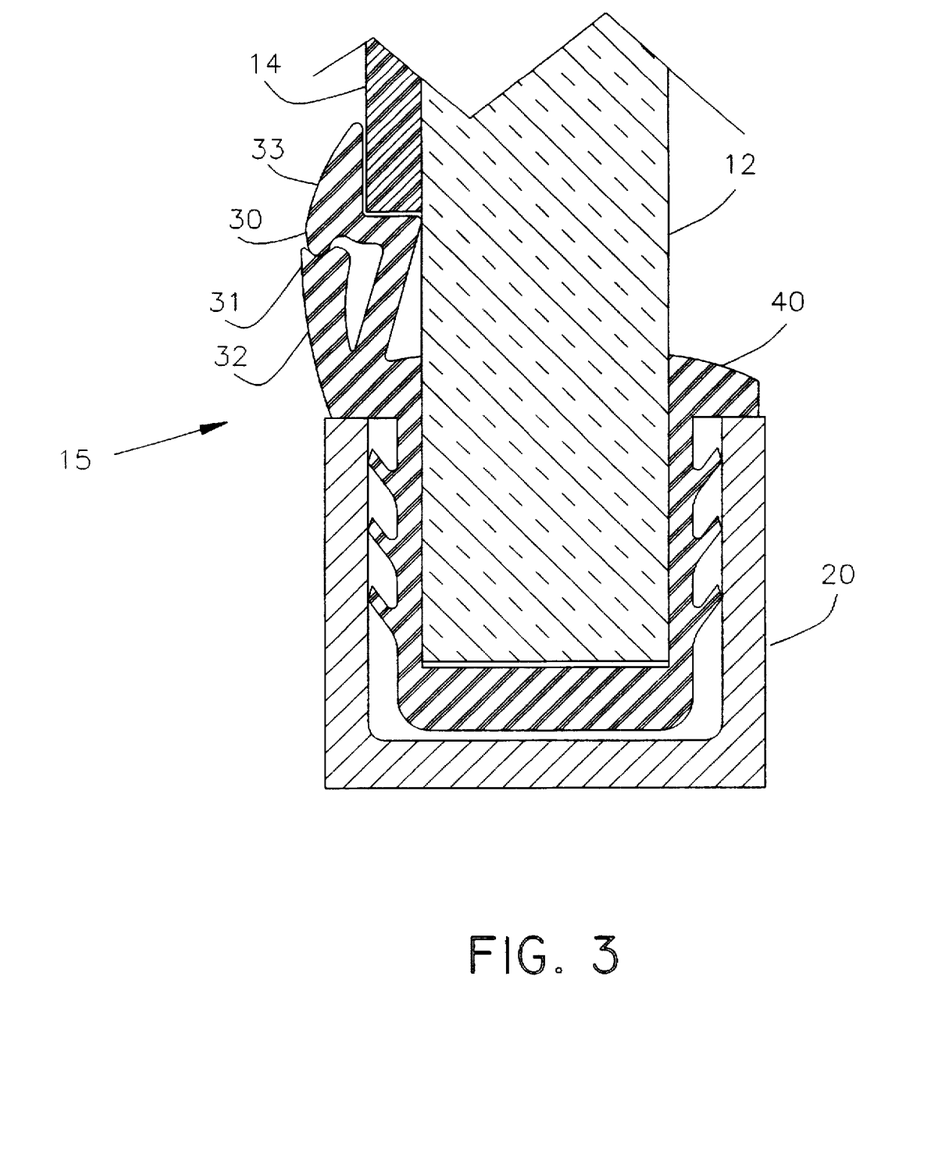
FIG. 3 is a cross sectional view of an alternative embodiment of a slidable window assembly suitable for sliding in a track (not shown), showing a unitary seal assembly combining the wedge seal segment and the channel glazing seal segment into one piece, as can be used in a sliding or channel glazed window assembly.

FIG. 3 shows another preferred embodiment wherein the wedge seal segment and channel seal segment are unitary with each other. Those skilled in the art will recognize that the embodiment of FIG. 3 operates in accordance with the principles discussed above in connection with the embodiments of FIGS. 1–2.

Figure 4:
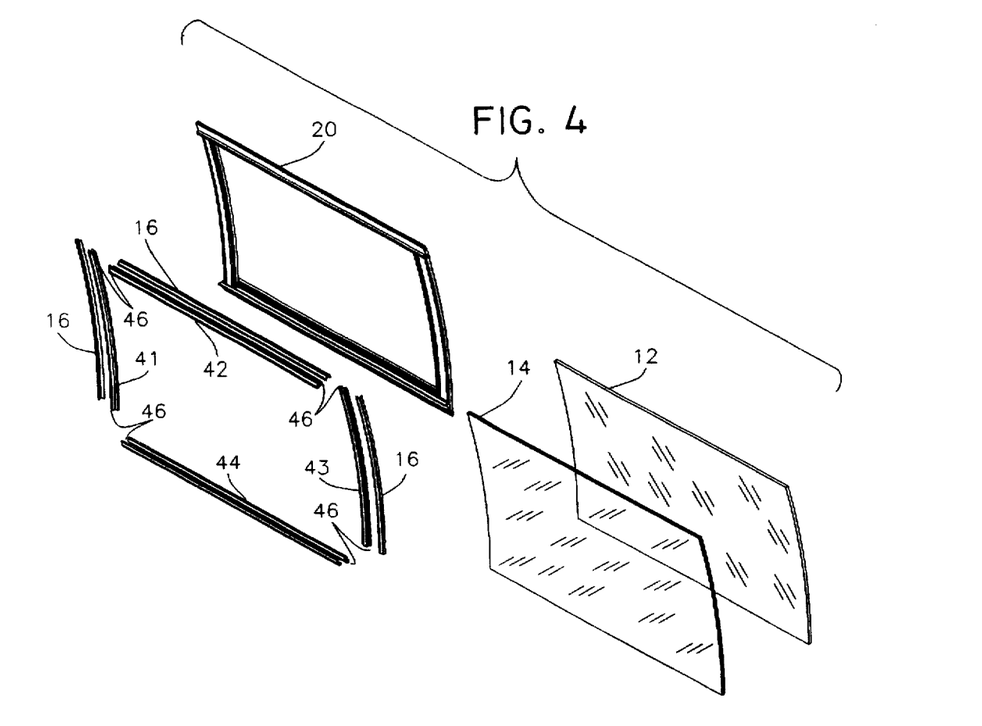
FIG. 4 is an exploded perspective view of the window assembly in accordance with another preferred embodiment, showing four wedge seal segments with mitered ends cooperatively forming a generally rectangular-shaped seal assembly.

Those skilled in the art will recognize that the seal assembly 15 need not completely surround the periphery of the plastic glazing, and that the seal assembly may be composed of a single channel glazing segment and a single wedge seal segment or may have multiple wedge seal segments 41–44, as is shown in FIG. 4. The ends 46 of the seal segments preferably may be mitered to provide a snug contacting sealing surface between segment ends.

In accordance with a retrofitting apparatus of this invention, a retrofitting kit of materials may be used to add a sacrificial glazing onto an existing window assembly. The kit of materials comprises at least one sacrificial glazing panel, one wedge seal segment, and in the case of generally rectangular window assemblies, preferably comprises four separate wedge seal segments 41–44 with mitered ends 46 each extending along one side of the sacrificial glazing panel. The mitered ends allow for each seal segment to be snug against one another, meaning surface-to-surface contact in slight compression. As seen in the preferred embodiment of FIG. 4, the retrofitting kit may optionally further comprise a replacement windowpane and channel glazing seal segments 16, for example, substantially as described above with reference to the embodiment of FIGS. 1–2.

In an alternative embodiment where removal of windowpane is not critical, as in sliding or channel glazed mass transit windows, a single unitary seal assembly 40 combining the channel glazing segment and the wedge seal segment into one piece may be used, as seen in the preferred embodiment of FIG. 3. The locking arms 33, 32 can be similar to those of the previous embodiment, but would preferably be unitary members of a single seal assembly. Although in this design it may be necessary to disassemble the frame to remove the windowpane, the sacrificial glazing may still be easily removed and a new sacrificial glazing panel installed in the manner discussed above with disassembly of the frame.

From the foregoing disclosure, it will be readily apparent to those skilled in the art, that is, to those who are knowledgeable or experienced in this area of technology, that the present invention provides a significant technological advance in cost, complexity reduction and in reduction of required tooling and secondary operations. Those who are skilled in this area of technology will recognize that various modifications and additions can be made to the preferred embodiments discussed above without departing from the true scope and spirit of the invention. For example, a pair of sacrificial glazing panels could be applied, each secured by a self-locking seal assembly, one on each side of the windowpane, to protect each side. Those skilled in the art will recognize from this disclosure the suitability of other designs and configurations which also provide for a window assembly with a low-cost sacrificial glazing design. All such alternative embodiments are intended to be covered by the following claims.

What is claimed is:

1. A window assembly comprising, in combination:
   a frame;
   a windowpane sized to fit within the frame;
   a removable sacrificial glazing panel having a peripheral edge and substantially covering one surface of the windowpane; and
   a self-locking seal assembly seated in said frame, having interlocking unitary arms which releasably captivates the removable glazing panel between the windowpane and the seal assembly;
   wherein the self-locking seal assembly captivates the windowpane and the sacrificial glazing when the unitary arms are locked and the self-locking seal assembly captivates the windowpane but does not captivate the sacrificial glazing when the unitary arms are unlocked.

2. The window assembly of claim 1 wherein the self-locking seal assembly securably biases the removable sacrificial glazing panel towards the windowpane.

3. The window assembly of claim 1 wherein the self-locking seal assembly comprises a first interlocking arm releasably seating in a receiving groove of a second interlocking arm to bias the removable glazing panel towards the windowpane.

4. The window assembly of claim 1 wherein the seal assembly is mounted on the frame at the peripheral edge of the removable sacrificial glazing panel.

5. The window assembly of claim 1 wherein the seal assembly is attached to the frame and extends around the periphery of the removable glazing panel and the seal assembly has a pair of ends in snug contact with one another.

6. The window assembly of claim 1 wherein the seal assembly has a channel glazing segment in which the windowpane seats and at least one wedge seal segment in which the removable sacrificial glazing panel seats.

7. The window assembly of claim 6 wherein the locking arms are unitary with the wedge seal segment.

8. The window assembly of claim 6 wherein the seal assembly has four wedge seal segments and each end of each wedge seal segment has a mitered surface to provide snug contact between each end of each wedge seal segment.

9. The window assembly of claim 1 wherein the seal assembly has a unitary spacing segment extending inward between the windowpane and the removable glazing panel to provide an air gap.

10. The window assembly of claim 1 wherein the windowpane, frame and sacrificial glazing are slidable from a closed position to an open position.

11. The window assembly of claim 1 wherein the windowpane, frame and sacrificial glazing are pivotably moveable from a closed position to an open position.

12. A window assembly comprising, in combination:
    a frame defining a first and second channel;
    a windowpane sized to fit within the frame;
    a removable glazing panel having a peripheral edge; and
    at least one self-locking seal assembly securing the windowpane to the frame and securing the removable glazing panel to the windowpane, comprising;
    a channel glazing segment, secured to the frame in the first channel, and
    a wedge segment, positioned around the peripheral edge of the removable glazing panel and secured to the frame in the second channel, having a main body, a first interlocking arm extending from the main body, with a locking lip extending from the first arm, and a second interlocking arm extending from the main body and provided with a receiving groove to lockingly engage the locking lip, thereby securing the glazing panel to the windowpane.

13. An apparatus comprising, in combination:
    a windowpane and a frame;
    a transparent sheet of material sized to substantially conform to a peripheral shape of an interior side of the windowpane; and
    a self-locking seal assembly attached to the frame and seated against the windowpane, having a pair of locking arms unitary with one another and lockingly engaged with one another to secure the transparent sheet over the windowpane;
    wherein the self-locking seal assembly in a locked position captivates the windowpane and the transparent sheet of material, and in an unlocked position captivates the windowpane but does not captivate the transparent sheet of material.

14. The apparatus of claim 13 wherein the transparent sheet has a generally rectangular shape, and the locking arms of the self-locking seal assembly define a recess to receive the transparent sheet with biasing force against the interior side of the windowpane.

15. A retrofitting kit for retrofitting a window assembly comprising, in combination:
    a transparent sheet of material; and
    at least one wedge seal segment comprising:
    a main body for releasably captivating a windowpane, having a substantially planar first surface adapted to be seated against the windowpane fixed in a frame,
    a first portion comprising a unitary protection extending from the main body, receivable into a channel in a frame, the unitary protection being remote from the first surface, interlocking arms unitary extending from the main body, movable between a locked position and an unlocked position, having a second surface which at least partially defining a recess formed free of the substantially planar first surface for receiving the transparent sheet of material when the interlocking arms are in the locking position, wherein the first and second surfaces are parallel with one another and with the recess when the interlocking arms are in the locked position, and are not parallel with one another when the interlocking arms are in the unlocked position, the first surface having a substantially fixed position relative to the first portion as the interlocking arms are moved between the locked and unlocked positions.

16. The retrofitting kit of claim 15 comprising four separate wedge seal segments, each attachable to a frame along one corresponding side of the transparent sheet, each segment having mitered ends providing snug contact between segment ends.

17. A window assembly comprising, in combination:

a frame;

a windowpane sized to fit within the frame;

a removable sacrificial glazing panel substantially covering a surface of the windowpane; and a self-locking seal assembly which secures the windowpane in the frame and has interlocking unitary arms which releasably captivate the removable glazing panel;

wherein the self-locking seal assembly captivates the windowpane and the sacrificial glazing when the unitary arms are in a locked position, and captivates the windowpane but does not captivate the sacrificial glazing when the unitary arms are in an unlocked position, and allowing to remove the sacrificial glazing panel independently of the windowpane.

18. A window assembly comprising, in combination:

a frame defining first and second channels;

a windowpane sized to fit within the frame;

a removable glazing panel having a peripheral edge; and at least one self-locking seal assembly securing the windowpane to the frame and securing the removable glazing panel to the windowpane, comprising a channel glazing segment secured to the frame in the first channel, and receiving the windowpane, and a wedge segment, secured to the frame in a second channel and having unitary interlocking arms which releasably captivate the removable glazing panel.

19. A window assembly comprising, in combination;

a frame;

a windowpane sized to fit within the frame;

a removable sacrificial glazing panel having a peripheral edge, substantially covering a surface of the windowpane; and a self-locking seal assembly having a main body which secures the windowpane in the frame and unitary releasable interlocking arms which urge a surface of the removable sacrificial glazing panel against a surface of the windowpane;

wherein the self-locking seal assembly captivates the windowpane and the sacrificial glazing when the interlocking arms are in a locked position, and captivates the windowpane but does not captivate the sacrificial glazing when the interlocking arms are in an unlocked position.

* * * * *